Inventor
John Bland
by Parker & Carter
Attorneys.

June 11, 1929.　　　J. BLAND　　　1,716,758

PROCESS OF SEPARATING MICA

Filed Dec. 3, 1924　　　2 Sheets-Sheet 2

Inventor
John Bland
by （signature）
Attorneys.

Patented June 11, 1929.

1,716,758

UNITED STATES PATENT OFFICE.

JOHN BLAND, OF CHICAGO, ILLINOIS.

PROCESS OF SEPARATING MICA.

Application filed December 3, 1924. Serial No. 753,570.

This invention relates to a process of separating flat material from material of other shapes. It is particularly applicable to the separation of mica from other material with which it is commonly found to be associated. One object of the invention is to provide automatic steps for separating out the mica, as far as possible for crushing, the unseparated mica and the material with which it is found, and subsequently separating the mica from the residue. Other objects will appear from time to time throughout the specification and claims.

My invention is illustrated more or less diagrammatically in the accompanying drawings, wherein.

Like parts are designated by like characters throughout.

A is the lower half of a double-decked screen section. It has in it an upper screen $A^1$ and a lower screen $A^2$. The two screen frames are fastened together so that they make up a double-decked section B, which moves as one. The lower end of each of the screen sections A and B is carried in a support C, and the upper end of each of the two decks is carried on a support $C^1$. This may be a spring support as shown or any suitable type of rear support might be used.

D is a spring member mounted at its lower end on the frame carrying screen $A^2$ and at the upper end on the screen carrying frame $B^1$. There are preferably two such spring members one mounted on either side of the screen assembly. These springs carry a shaft $D^1$, upon which there is mounted an out-of-balance fly wheel $D^2$. $D^3$ is a belt pulley mounted on the shaft $D^1$ rotated by means of a belt $D^4$, from any suitable power source.

Beneath the screen is a hopper E terminating in a chute $E^1$. F F are a pair of crushing rolls above the upper screen. The material is initially fed to the rolls by means of a chute or spout $F^1$. It passes through them and is deposited on the upper screen deck.

G is a hopper intended to receive the mica or other material which is to be separated out. It terminates in a chute $G^1$. H is a receiving trough adapted to receive material from the first and third screens. It communicates with an elevator $H^1$ which by means of the chute $H^2$ delivers material from the screens to the rolls F F, between which it is crushed and again passes to the top or second screen.

I is a chute leading from the first screen which conveys material which passes over that screen to the receiving trough H. $I^1$ is a chute leading from the third screen $A^1$, which conveys material which passes over that screen to the receiving hopper H. J is a chute leading from the second screen which conveys material which has passed over that screen to the receiving hopper G. $J^1$ is a chute leading from the fourth screen $A^2$ which conveys material which has passed through the third screen over the fourth screen to the receiving hopper G.

As shown the first or top screen $B^1$ has laterally extending slots K. The second screen $B^2$ is provided with generally square openings $K^1$. These openings while being wider than the slots K of the previous screen, are shorter. In the third screen $A^1$ are provided elongated slots $K^2$, these slots being preferably about half the width of the slots K in the screen $B^1$ and approximately the length of the square openings in the screen $B^2$. In the fourth screen $A^2$ are square openings $K^3$ preferably about half the size of the square opening in the second screen $B^2$.

Figure 1:
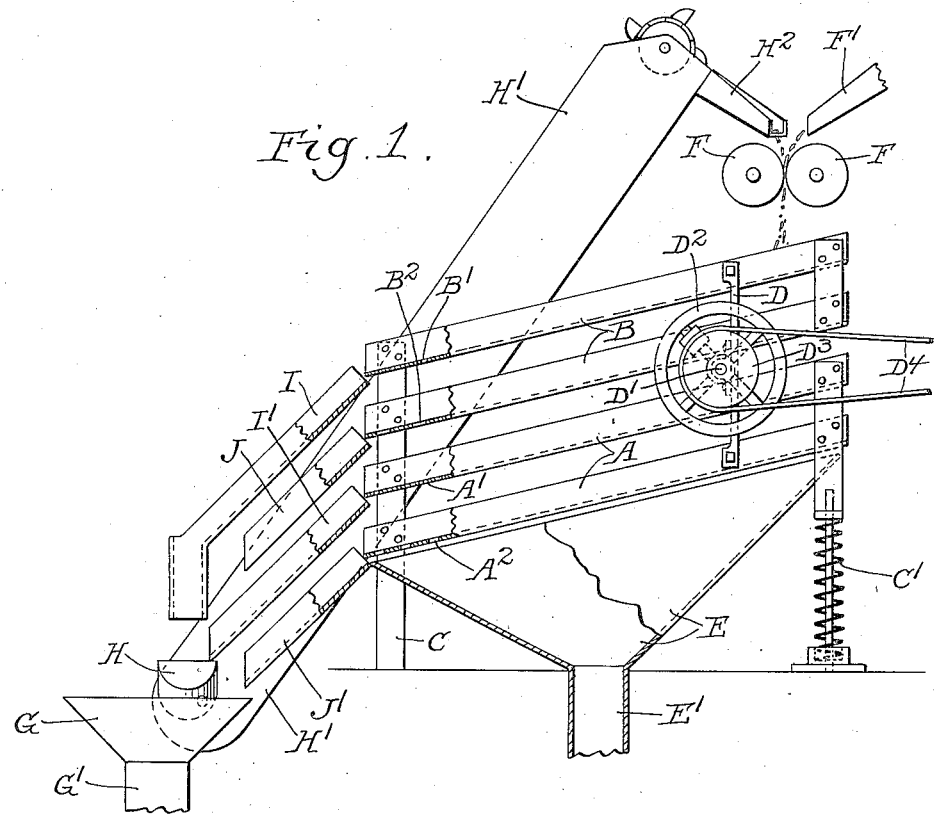
Figure 1 is a side elevation of a separation apparatus with parts in section.
Figure 2:
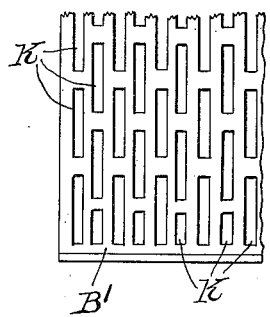
Figure 2 is a plan view of a portion of the first or uppermost screen on an enlarged scale.
Figure 3:
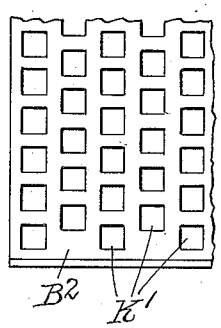
Figure 3 is a similar view showing the second screen.
Figure 4:
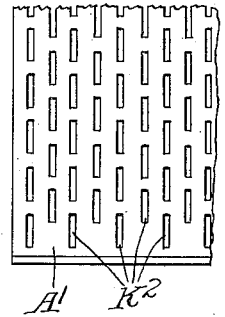
Figure 4 is a similar view showing the third screen.
Figure 5:
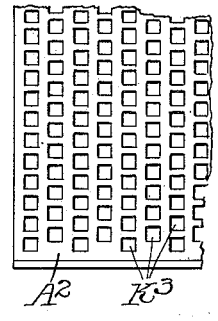
Figure 5 is a similar view showing the fourth screen.
Figure 6:
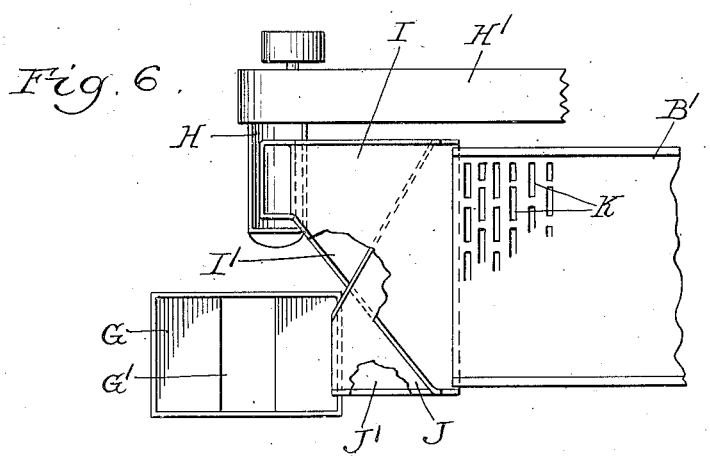
Figure 6 is a plan view showing the discharge end of the separation apparatus.
Figure 7:
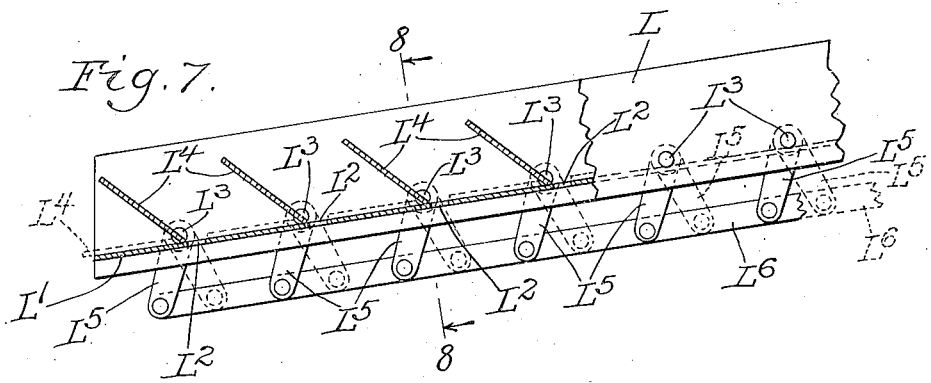
Figure 7 is a longitudinal vertical cross section of a spreading and agitating device for the screen in position for agitating, shown here as applied to a one-decked screen.
Figure 8:
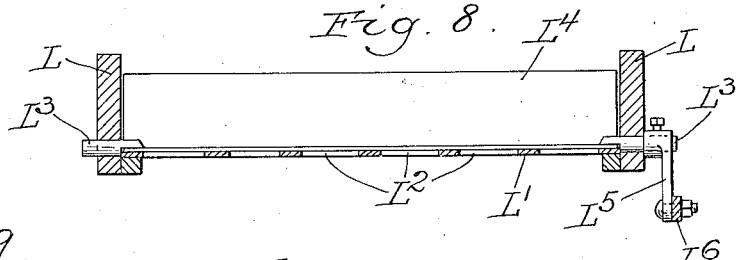
Figure 8 is a transverse cross section taken on the line 8—8 of Figure 7.
Figure 9:
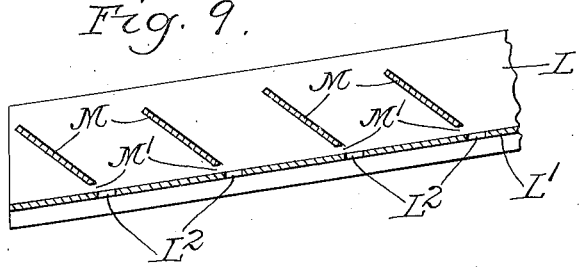
Figure 9 is a view similar to Figure 7 showing a modified form in which the spreading device is fixed.

The device shown in Figures 7, 8 and 9 is illustrated there only in connection with a single screen. It can, of course be applied to a single screen or to a multiple decked screen or to only one deck or one or more decks, of a multiple decked screen. Its use and operation is usually the same whether or not it is applied to one screen or more.

In the form there shown L is a screen frame in the bottom of which a screen $L^1$ is positioned, provided with openings $L^2$. Pivoted at appropriate points in the sides of the screen frame are short shafts $L^3$. Pairs of these shafts are attached to and joined by a shutter vane $L^4$. Fastened to each of the shafts $L^3$ on one side of the frame is a crank arm $L^5$. These arms are joined together by means of a connecting bar $L^6$.

When the bar is moved, the cranks swing in unison and the vanes are raised and lowered. As shown a vane is preferably positioned with its lower edge close to and below a screen opening.

As shown in Figure 9 the screen frame and screen are the same as that shown in Figures 7 and 8, except that instead of having movable vanes, fixed vanes M are provided. These vanes are situated near the openings $L^2$ but are raised above the level of the screen so that between the bottom edge of each of them and the screen is provided an opening $M^1$.

Although I have shown an operative device, still it will be obvious that many changes might be made in size, shape and arrangement of parts without departing materially from the spirit of my invention; and I wish, therefore, that my showing be taken as in a sense diagrammatic.

The use and operation of my invention are as follows:

The material as it is passed through the rolls is crushed. The mica, however, being laminated does not crush readily, and it is the other material, which is with the mica which is generally crushed.

All of the material is deposited on the top screen and the mica to a considerable degree passes through the long thin openings onto the second screen and passes off of that screen into the mica hopper. Some of the foreign material does not pass through the screen but passes over it with some of the mica and falls into the conveyor chute and is carried up the conveyor and through the rolls where the foreign matter is crushed again together with the mica and falls upon the upper screen. Such of the foreign matter as passes through the first screen into the second will to a very large extent pass through the openings in the second screen. The mica, however, will to a large degree pass over these openings since the openings are generally shorter than the width of the pieces of mica.

After passing through the first screen it passes over the second screen into the mica hopper. The foreign material, however, which passes through the first screen will pass through the second screen even more readily than it did through the first screen and comes out upon the third screen. Some mica, of course, also comes through to this screen.

The mica and foreign matter which comes on the third screen and do not pass through it, fall into the conveyor and are carried up, pass through the rolls, are crushed again, and again work through the first and second screens. Some of the mica will pass through the thin narrow slots of the third screen into the fourth screen, and because of the smaller size of the openings in the fourth screen will pass through it into the mica hopper. Such of the foreign matter as passes through the third screen will also pass through the fourth screen because the openings in the fourth screen although shorter than those in the third screen, are wider and therefore the foreign matter which passes through the third screen will to a very large degree pass through the fourth. The mica which passes through the third screen will not pass through the fourth but will pass off it into the mica hopper. Thus by passing the mica and foreign matter over successive screens having first narrow slots and then square openings, the mica passes generally through the narrow slots and the foreign matter into the square openings. Mica to a very large degree is present in flakes or sheets, whereas the foreign matter is present in more or less lumpy and granular formations which do not readily pass through the thin openings but do very readily pass through the square openings.

When the spreading and agitating device shown in Figures 7, 8, and 9 is used, it is preferably associated only with the screens having the narrow slots, although it may be used with all of the screens. Its function is to cause the mica flakes or sheets to be raised so that their edges more easily enter and pass through the slots. Thus with the form shown in Figure 7 the agitating vanes are generally flat, lying upon the screen. The material passing over the screens passes over them. Periodically they are raised to the position shown in Figure 7, and the material slides off of them, the flaky flat pieces of mica sliding into and through the slots.

In the form shown in Figure 9 the vanes are stationary. Some of the mica will pass across the surface of the screen under the vanes, and some of it will pass through the slots in the screen, and some of it will tend to pile or climb up the vanes and then to slide down, and since they are raised to an angular position with relation to the normal surface of the screen, when they slide back their edges tend more readily to enter and catch in the slots of the screen surface and they thus more readily pass through the slots than is the case where simple slotted screens are used, without any deflecting, guiding or agitating bars or surfaces.

I claim:

1. The process of separating mica from miscellaneous material according to shape wherein flat mica is separated from material of other shapes which includes the step of acting upon a quantity of mixed material to remove the non-flat material from the main body of material, and subsequently separating out alternately non-flat material above a given size, flat material above a given size, non-flat material of a smaller size, and flat material of a smaller size.

2. The process of separating mica from miscellaneous material according to shape wherein flat mica is separated from material of other shapes which includes the step of acting upon a quantity of mixed material to remove the non-flat material of large size from the main body of material, and subsequently carrying out the following steps: separating out the flat material of large size, separating the non-flat material of smaller size, and separating out finally the flat material of smaller size.

Signed at Chicago, county of Cook, and State of Illinois, this 19th day of November, 1924.

JOHN BLAND.